US012680352B2

(12) United States Patent
Tomao et al.

(10) Patent No.: US 12,680,352 B2
(45) Date of Patent: Jul. 14, 2026

(54) WATER RESISTANT SLAM LATCH

(71) Applicant: Whitecap Industries, Inc., Piscataway, NJ (US)

(72) Inventors: Christopher E. Tomao, Robbinsville, NJ (US); Todd Moore, St. Paul, MN (US)

(73) Assignee: Whitecap Industries, Inc., Piscataway, NJ (US)

( * ) Notice: Subject to any disclaimer, the term of this patent is extended or adjusted under 35 U.S.C. 154(b) by 36 days.

(21) Appl. No.: 18/899,201

(22) Filed: Sep. 27, 2024

(65) Prior Publication Data

US 2025/0109618 A1 Apr. 3, 2025

Related U.S. Application Data

(60) Provisional application No. 63/542,042, filed on Oct. 2, 2023.

(51) Int. Cl.
*E05C 1/14* (2006.01)
*B63B 19/00* (2006.01)
(Continued)

(52) U.S. Cl.
CPC .............. *E05C 1/145* (2013.01); *B63B 19/00* (2013.01); *E05B 65/001* (2013.01); *E05C 1/004* (2013.01); *B63B 2019/0053* (2013.01)

(58) Field of Classification Search
CPC ...... E05B 65/001; E05B 15/04; E05B 17/002; E05C 1/145; E05C 1/004; E05C 1/085; E05C 1/10; E05C 1/12; E05C 1/14; E05C 3/042; E05C 9/002; E05C 19/028; E05C 21/00; B63B 19/00; B63B 2019/0053; Y10T 292/096; Y10T 292/0969; Y10T 292/097; Y10T 292/0974; Y10T 292/0977; Y10T 292/0994; Y10T 292/1015; Y10T 70/5111; Y10T 70/569; Y10T 70/5761; Y10T 70/5496; Y10T 70/5491; Y10T 70/5757; Y10T 70/5805; Y10T 70/5819;
(Continued)

(56) References Cited

U.S. PATENT DOCUMENTS

| | | | | | |
|---|---|---|---|---|---|
| 2,871,048 | A * | 1/1959 | Balogh | E05C 1/145 | 292/336.3 |
| 3,283,549 | A * | 11/1966 | Mees | E05C 1/145 | 70/467 |

(Continued)

FOREIGN PATENT DOCUMENTS

| | | | | |
|---|---|---|---|---|
| CN | 108086813 A * | 5/2018 | E05B 65/52 |
| GB | 1313461 A * | 4/1973 | E05C 1/145 |

(Continued)

*Primary Examiner* — Steven A Tullia
(74) *Attorney, Agent, or Firm* — Servilla Whitney LLC

(57) ABSTRACT

A latch assembly is provided, which comprises a latch body comprising a first side, a second side opposite the first side, a slide lock receiving channel, and a cavity between the first side and the second side. The latch assembly includes a handle comprising a first pivotable portion joined to a first end of a transition region and a pawl engagement tab extending from a second end the transition region, the transition region including a pivot and the handle pivotably mounted in the cavity, and a removable a slide lock assembly.

20 Claims, 4 Drawing Sheets

(51) Int. Cl.
*E05B 65/00* (2006.01)
*E05C 1/00* (2006.01)

(58) Field of Classification Search
CPC ............. Y10T 70/5823; Y10T 70/5827; Y10T 70/5832; Y10S 292/31; Y10S 70/31
USPC ............................................................ 70/162
See application file for complete search history.

(56) References Cited

U.S. PATENT DOCUMENTS 3,449,005 A * 6/1969 John, Jr. ................. E05C 1/145 292/173
3,743,336 A * 7/1973 Andrews ................. E05C 1/145 292/191
3,782,141 A * 1/1974 Doerrfeld ............... E05C 1/145 292/DIG. 31
4,138,869 A * 2/1979 Pelcin ..................... E05B 55/00 292/DIG. 31
4,231,597 A * 11/1980 Pelcin ..................... E05C 1/145 292/164
4,309,884 A * 1/1982 Davis ...................... E05C 1/145 292/DIG. 31
4,320,642 A * 3/1982 Pastva, Jr. ............... E05C 1/145 292/DIG. 31
4,335,595 A * 6/1982 Swan ...................... E05C 1/145 292/DIG. 31
4,420,954 A * 12/1983 Hieronymi .............. E05C 1/145 292/DIG. 31
4,872,326 A * 10/1989 Aurness .................... E05C 1/14 70/133
5,058,937 A * 10/1991 Miehe ..................... E05C 1/145 292/DIG. 31
D324,636 S 3/1992 Schlack et al.
5,299,844 A * 4/1994 Gleason .................. E05C 3/122 292/DIG. 31
D370,620 S 6/1996 Ziemer
6,109,669 A * 8/2000 Pinkow ................... E05C 1/145 292/DIG. 31
6,460,902 B1 * 10/2002 Kyle ....................... B63B 19/24 292/DIG. 31
6,553,796 B2 * 4/2003 Finch .................... E05B 13/002 70/478
D475,602 S 6/2003 McCloskey
6,604,393 B2 * 8/2003 Larsen .................... E05B 35/10 70/379 R
6,626,472 B1 * 9/2003 Berg ..................... E05B 13/002 292/DIG. 31
6,719,332 B2 * 4/2004 Sekulovic ............... E05C 3/162 292/DIG. 31
D489,958 S 5/2004 Jackson et al.
D489,959 S 5/2004 Jackson et al.
D497,098 S 10/2004 Magnusson
6,877,782 B2 * 4/2005 Magnusson ............. E05C 1/145 292/DIG. 31
D506,120 S 6/2005 Straka, Jr. et al.
6,953,209 B2 * 10/2005 Jackson, Jr. ........ E05B 17/0025 292/DIG. 31
7,066,504 B2 * 6/2006 Perkins ................... E05C 1/145 292/DIG. 31
7,083,205 B2 * 8/2006 Hall ........................ E05B 63/14 292/34
D530,181 S 10/2006 Straka, Jr. et al.
7,182,374 B2 * 2/2007 Figge ...................... E05C 1/145 292/334
7,452,010 B2 * 11/2008 Cotton ...................... E05C 5/02 292/DIG. 31
D582,250 S 12/2008 Johansson
D596,920 S 7/2009 Cotton et al.
8,186,191 B2 * 5/2012 Bacon ..................... E05B 59/00 292/201
8,347,667 B2 * 1/2013 Bacon ..................... E05B 59/00 292/216
8,424,931 B2 * 4/2013 Chang .................. G11B 33/123 292/164
8,579,337 B2 * 11/2013 Hidding .................. E05B 79/12 292/DIG. 31
8,789,858 B2 * 7/2014 Loret de Mola ....... E05C 1/085 292/164
9,085,919 B2 * 7/2015 Bacon ..................... E05B 81/77
D761,635 S 7/2016 Bridgewater
D777,010 S 1/2017 Sarnowski et al.
D782,899 S 4/2017 Bridgewater
9,624,700 B2 * 4/2017 Wollacott ................ E05B 63/06
9,725,933 B2 * 8/2017 Chen ....................... E05B 65/46
9,940,767 B2 * 4/2018 Bacon ..................... E05B 81/66
10,378,237 B2 * 8/2019 Bacon ................ G07C 9/00174
10,697,214 B2 * 6/2020 Onorato .................. E05B 15/04
2003/0234542 A1 * 12/2003 Furlong .................. E05C 1/145 292/121
2006/0033344 A1 * 2/2006 Blake ...................... B29C 45/16 292/173
2006/0238287 A1 * 10/2006 Furia ....................... E05C 17/56 335/285
2006/0255596 A1 * 11/2006 Yong ......................... E05C 1/14 292/173
2008/0110906 A1 * 5/2008 Thompson .............. B63B 19/00 220/663
2011/0115239 A1 * 5/2011 Imatomi ................ B60K 15/05 292/143
2012/0174633 A1 * 7/2012 Bacon ..................... E05B 85/22 70/77

FOREIGN PATENT DOCUMENTS

KR 200487875 Y1 * 11/2018 ............. E05B 67/38
WO WO-0019050 A1 * 4/2000 ............. E05C 1/145

* cited by examiner

WATER RESISTANT SLAM LATCH

CROSS-REFERENCE TO RELATED APPLICATIONS

The instant patent application claims priority to U.S. provisional application Ser. No. 63/542,042, filed on Oct. 2, 2023, the entire content of which is incorporated herein by reference.

TECHNICAL FIELD

The present disclosure relates generally to generally to latches. More particularly, the present disclosure relates to a water-resistant slam latch.

BACKGROUND

A slam latch uses a spring mechanism to close a door or panels, providing a convenient and secure lock tight action. The slam latch derives its name from its ability to slam doors and drawers shut without damaging the latch. Slam latches may include spring-loaded catches that latch a door shut when the door is pushed shut against the bias of the spring-loaded catch. Accordingly, a door can be slammed shut to activate the latching mechanism. Different versions of slam latches do not include a locking mechanism, while other versions may include a locking mechanism for applications in which security is desired.

When used on marine vessels such as boats, slam latches secure hatches and doors that cover openings in various compartments, cabinets and enclosures of the boat. The handle is typically D-shaped or T-shaped, and foldable between an extended position in which the handle can be grasped by a user to open a hatch or door to which a sliding pawl is assembled. For slam latches used in marine applications, it is desirable to use at least a water resistant latch, and in in some instances a waterproof latch, to prevent water from flowing through the area where moving parts of the latch are located. Some slam latches include a bore, through which water can enter if the seal between the latch and bore is not water resistant or waterproof. Existing waterproof or water-resistant slam latches are complicated in design, costly to produce and assemble and provide. In addition, when a wear part such as an O-ring needs replacement, because of the construction of many types of waterproof slam latches, the consumer is forced to replace the entire slam latch assembly, which is an expensive part and a waste of an otherwise acceptable latch.

Accordingly, there remains a need for improved slam latches that are simple in design, easy to assemble, reliable, low in cost, and provide improved ways to latch and unlatch the latch assembly without providing additional openings to allow water to enter the slam latch body and contact the slam latch components. In addition, slam latches are needed that are easier to service without having to replace the entire slam latch assembly when a wear component requires replacement.

SUMMARY

One or more embodiments of the disclosure are directed to A latch assembly comprising a latch body comprising a first side, a second side opposite the first side, a slide lock receiving channel, and a cavity between the first side and the second side; a handle comprising a first pivotable portion joined to a first end of a transition region and a pawl engagement tab extending from a second end the transition region, the transition region including a pivot and the handle pivotably mounted in the cavity; and a slide lock assembly including a pawl engagement rod and a pawl slidably mounted within the slide lock receiving channel and biased outwardly from the latch body to a latched position, the pawl engagement tab positioned and configured to directly engage the pawl engagement rod when the first pivotable portion of the handle is pivoted from the cavity.

In a second embodiment, a latch assembly comprises a latch body comprising a first side, a second side opposite the first side, a slide lock receiving channel, and a cavity between the first side and the second side; a handle comprising a first pivotable portion joined to a first end of a transition region and a pawl engagement tab extending from a second end the transition region, the transition region including a pivot and the handle pivotably mounted in the cavity; and a removable a slide lock assembly including a pawl engagement rod and a pawl slidably mounted within the slide lock receiving channel and biased outwardly from the latch body to a latched position, the pawl engagement tab positioned and configured to directly engage the pawl engagement rod when the first pivotable portion of the handle is pivoted from the cavity, wherein the slide lock assembly comprises a removable cover plate, enabling access to the slide lock assembly.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
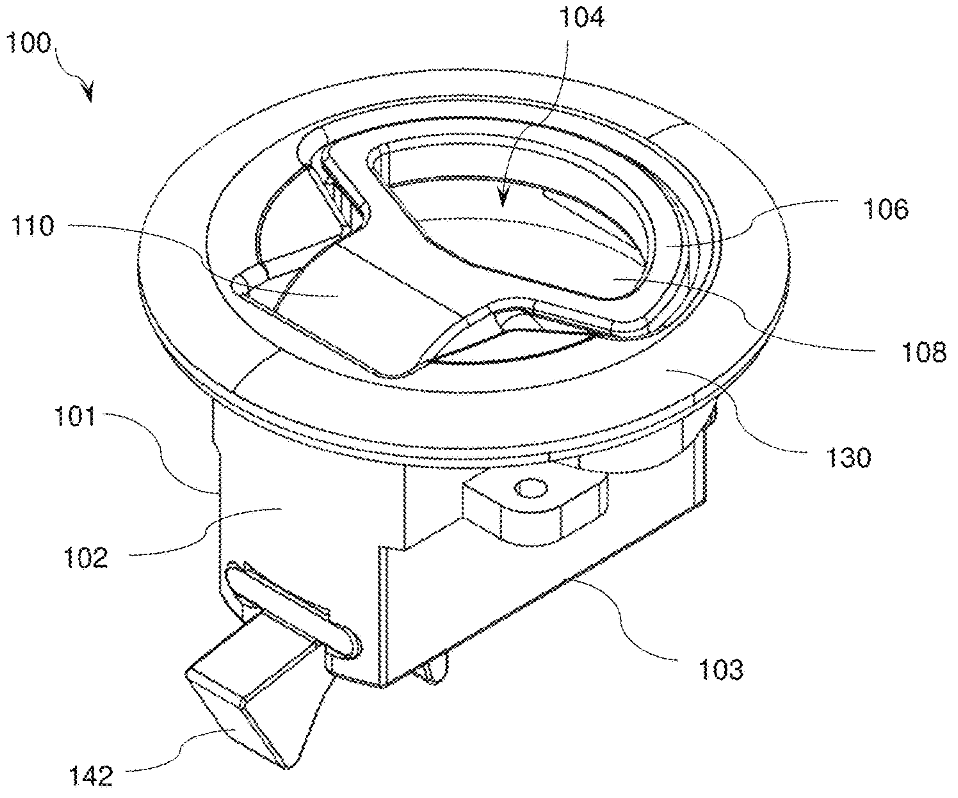
FIG. 1 is an isometric view of a latch assembly including a latch pawl according to an embodiment of the disclosure.
Figure 2:
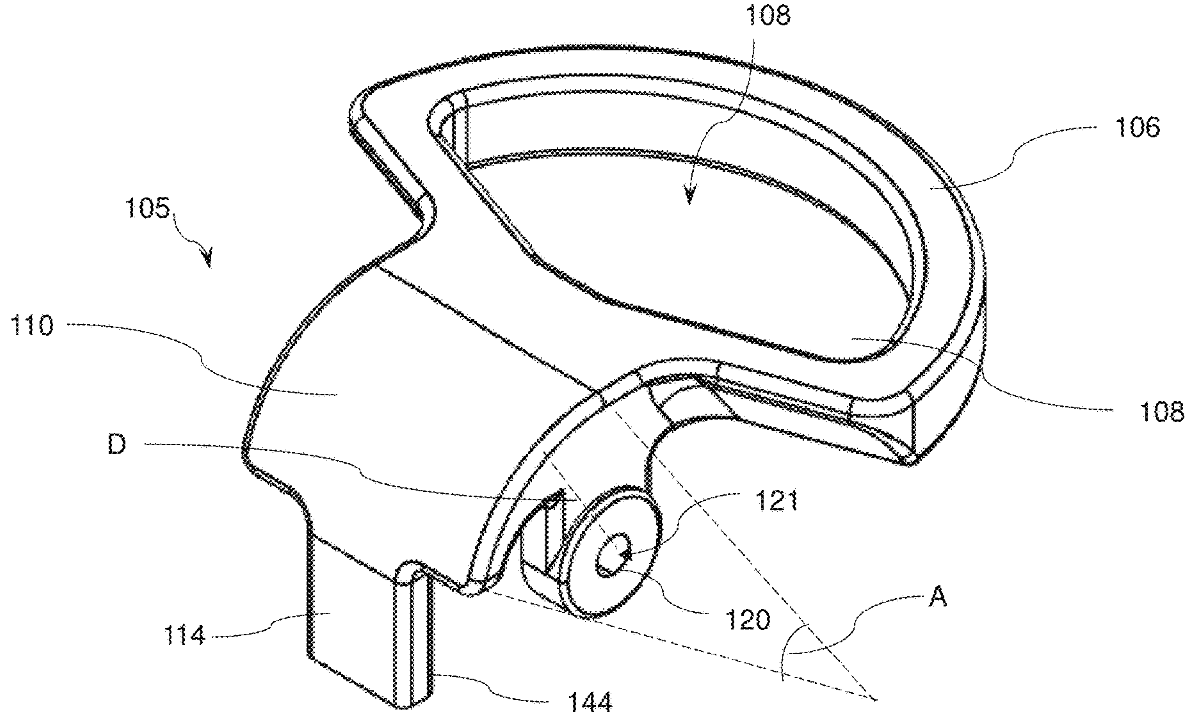
FIG. 2 is an isometric view of the handle of the latch assembly shown in FIG. 1.
Figure 3:
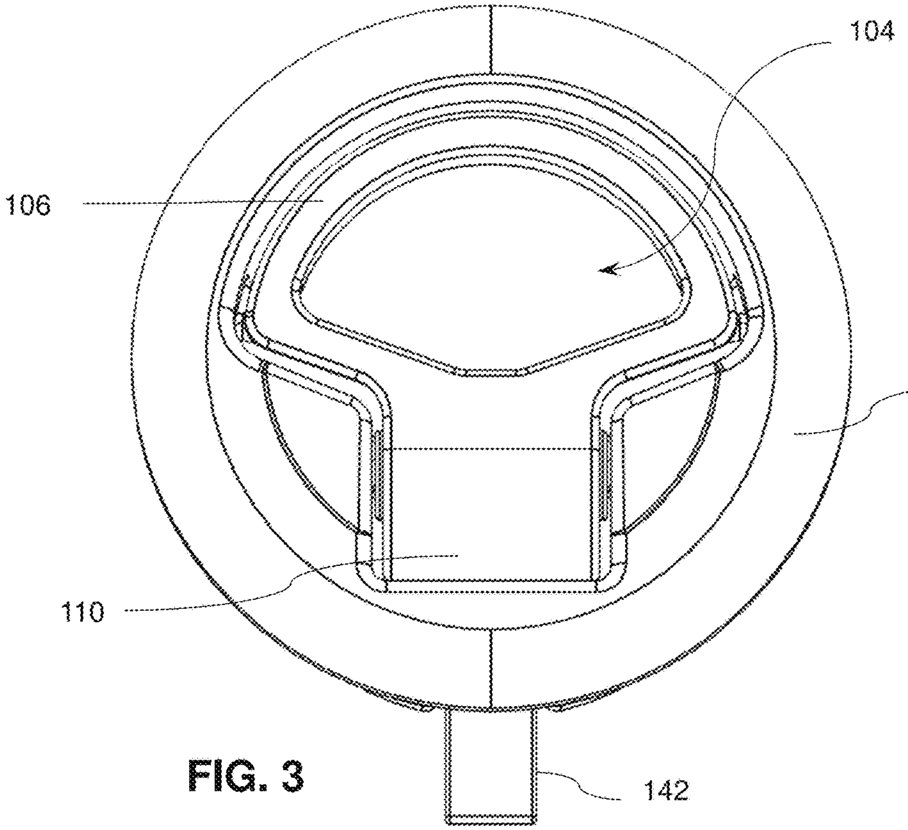
FIG. 3 a top plan view of the latch assembly of FIG. 1, which shows the latch assembly without a lock assembly.
Figure 4:
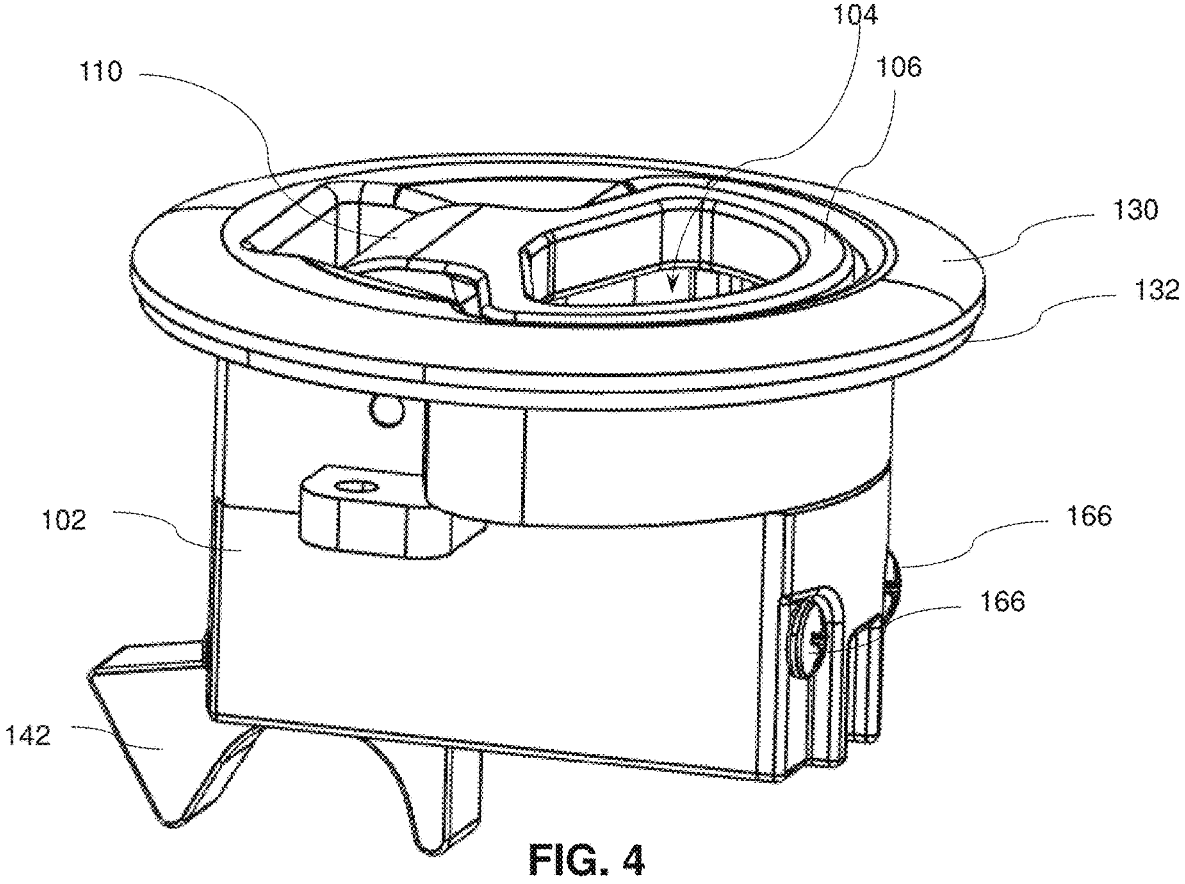
FIG. 4 is a side view of the latch assembly including the latch pawl shown in FIG. 1.

Before describing several exemplary embodiments of the disclosure, it is to be understood that the disclosure is not limited to the details of construction or process steps set forth in the following description. The disclosure is capable of other embodiments and of being practiced or being carried out in various ways.

The term "horizontal" as used herein is defined as a plane parallel to the plane or surface of a compression latch, regardless of its orientation. The term "vertical" refers to a direction perpendicular to the horizontal as just defined. Terms, such as "above", "below", "bottom", "top", "side"

(as in "sidewall"), "higher", "lower", "upper", "over", and "under", are defined with respect to the horizontal plane, as shown in the figures.

The term "on" indicates that there is direct contact between elements. The term "directly on" indicates that there is direct contact between elements with no intervening elements.

According to one or more embodiments, a latch assembly 100 is provided that is substantially waterproof or water-resistant to resist water from passing through the latch or a bore in which the latch is a part of the latch assembly. In one or more embodiments, the latch is a slam latch with a pawl including a pawl engagement rod. A sealing member, for example a sleeve and an O-ring, can be disposed around the pawl engagement rod to reduce water entering through the latch and causing problem and leakage into a compartment that the latch assembly is used to secure shut. In particular, the sleeve can be located around the pawl engagement rod and include a seat that maintains the O-ring in position to aid in sealing an orifice in which the pawl engagement rod moves. The O-ring and the pawl engagement rod are configured to enclose the cavity in which the latch handle is maintained so water cannot enter through the cavity.

Contrary to existing designs, the handle of the pawl assembly directly engages the pawl engagement rod, instead of utilizing a pin, which complicates the deign and provides additional opportunities for leakage of water through the body of the latch assembly. Advantageously, the pawl is part of a slide lock assembly that is removably mounted from the body of the latch assembly. Because the slide lock assembly is removable, a user of the latch assembly can access the pawl and the O-ring, enabling the O-ring and other wear parts such as a biasing element (e.g., a spring) to be replaced. Thus, rather than a user having to replace the entire latch assembly, which is unduly expensive and wastes an otherwise useable latch assembly, a thrifty boat owner may replace the O-ring should the O-ring become worn or otherwise compromised. Similarly, should the biasing element such as a spring become worn or fails, a user can replace the spring. The latch assemblies described herein according to one or more embodiments meet a longstanding need to provide serviceable latch assemblies and providing boat owners the option to utilize more economical options to service latch assemblies, instead of having to purchase an entirely new latch assembly.

Referring now to FIGS. 1-6, an embodiment of a latch assembly 100 is shown. The latch assembly 100 a latch body 102 comprising a first side 101, a second side 103 opposite the first side 101, a slide lock receiving channel 168, and a cavity 104 between the first side 101 and the second side 103 of the latch body 102. Generally, the latch body 102 and the latch assembly comprise metal, for example stainless steel, aluminum, alloys and other suitable metals used in the manufacture of latch assemblies. In some embodiment the components of the latch assembly may comprise plastic.

The embodiment of the latch assembly 100 comprises a handle 105 comprising a first pivotable portion 106 joined to a first end of a transition region 110 and a pawl engagement tab 114 extending from a second end the transition region 110. The transition region 110 of the handle 105 includes a pivot 120 at opening 121 and the handle 105 is pivotably mounted in the cavity 104 of the latch assembly 100.

The handle 105 shown is a D-shaped handle having an opening 108 therein, however, the embodiment shown is not limiting. In some embodiments, the handle 105 may be in the form of what is known as a T-handle, which generally has a T-shape. The latch assembly 100 includes a handle biasing element which is shown as a spring 111 that biased the handle to a closed position in the cavity 104.

In the embodiment shown, the latch assembly 100 further includes a retaining ring 130 and a latch ring gasket 132, which aids in providing a water tight seal when the latch assembly 100 is mounted to a door or a hatch.

Figure 5:
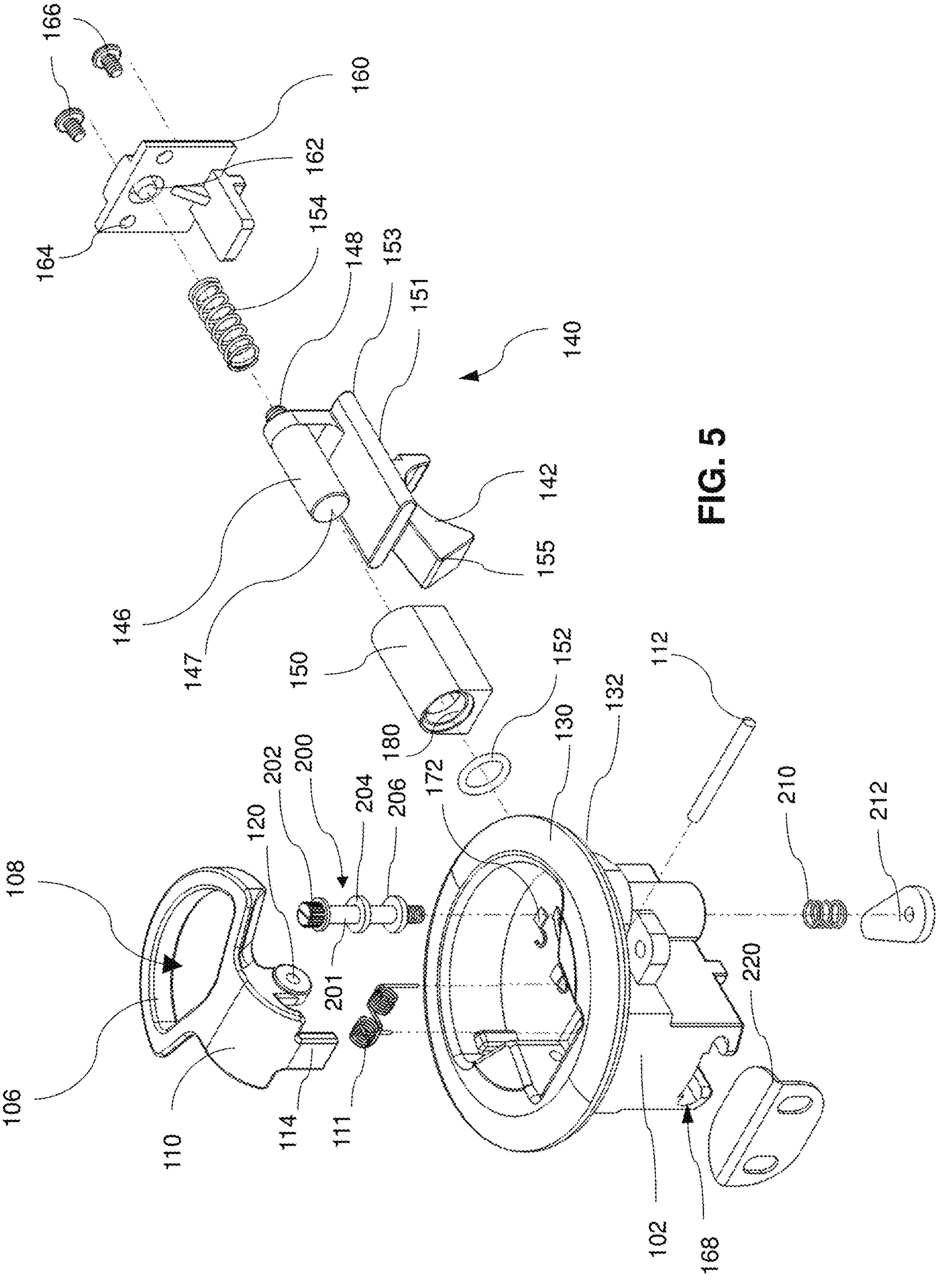
FIG. 5 is an exploded view of the latch assembly including the latch pawl shown in FIG. 1 and including a lock assembly.

As best shown in FIG. 5, a slide lock assembly 140 includes a pawl engagement rod 146 and a pawl 142 slidably mounted within the slide lock receiving channel 168. The pawl engagement rod 146 and the pawl 142 are biased outwardly from the latch body 102 to a latched position. The pawl engagement tab 114 is positioned on the handle 105 and is configured to directly engage the pawl engagement rod 146 when the first pivotable portion 106 of the handle 105 is pivoted away from the cavity 104 of the latch assembly 100. As used herein, "directly engage" refers to the fact that there is no intervening structure(s) such as single pin or multiple pins or other components. That is, the pawl engagement tab 114 is in direct contact with the pawl engagement rod 146 when the handle 105 is lifted upwardly out of the cavity to release the pawl and to unlatch the latching assembly from a lock catch 220, which may be assembled to a compartment frame, a cabinet frame or a door frame. Thus, the engagement tab 114 has an engagement surface 144 that is in direct contact without any intervening structure with the handle engagement surface 147 on the pawl engagement rod 146 when the handle 105 is lifted upwardly.

In one or more embodiments, when the first pivotable portion 106 of handle is pivoted from the cavity 104 of the latch assembly 100, the pawl engagement tab 114 directly moves the pawl engagement rod 146 and the pawl 142 inwardly from the latched position to an unlatched position. The slide lock assembly 140 includes a pawl main body 151 including a first end 153 and a second end 155. The pawl engagement rod 146 includes a second end 148, which in some embodiments is a threaded end. It was determined that by utilizing a pawl engagement rod 146 with a threaded second end 148, the allowed the pawl engagement rod 146 to be made from a machined part instead of a cast part, which affords the opportunity to provide a smoother pawl engagement rod that is configured to make a better seal with an O-ring than a cast part.

In the embodiment of the latch assembly 100 shown, the pawl engagement rod 146 is located in a spaced relationship from the pawl 142. That is the pawl 142 may be cast with the pawl main body 151 including a threaded opening to receive the second end 148 of the pawl engagement rod. The pawl main body 151 thus provides a platform to support the pawl 142 which protrudes from the pawl main body 151 from a lower portion of the pawl main body 151. The pawl engagement rod is substantially parallel to the pawl main body 151 and the second end 148 receives a pawl biasing element 154 in the form of a spring as shown.

Figure 6:
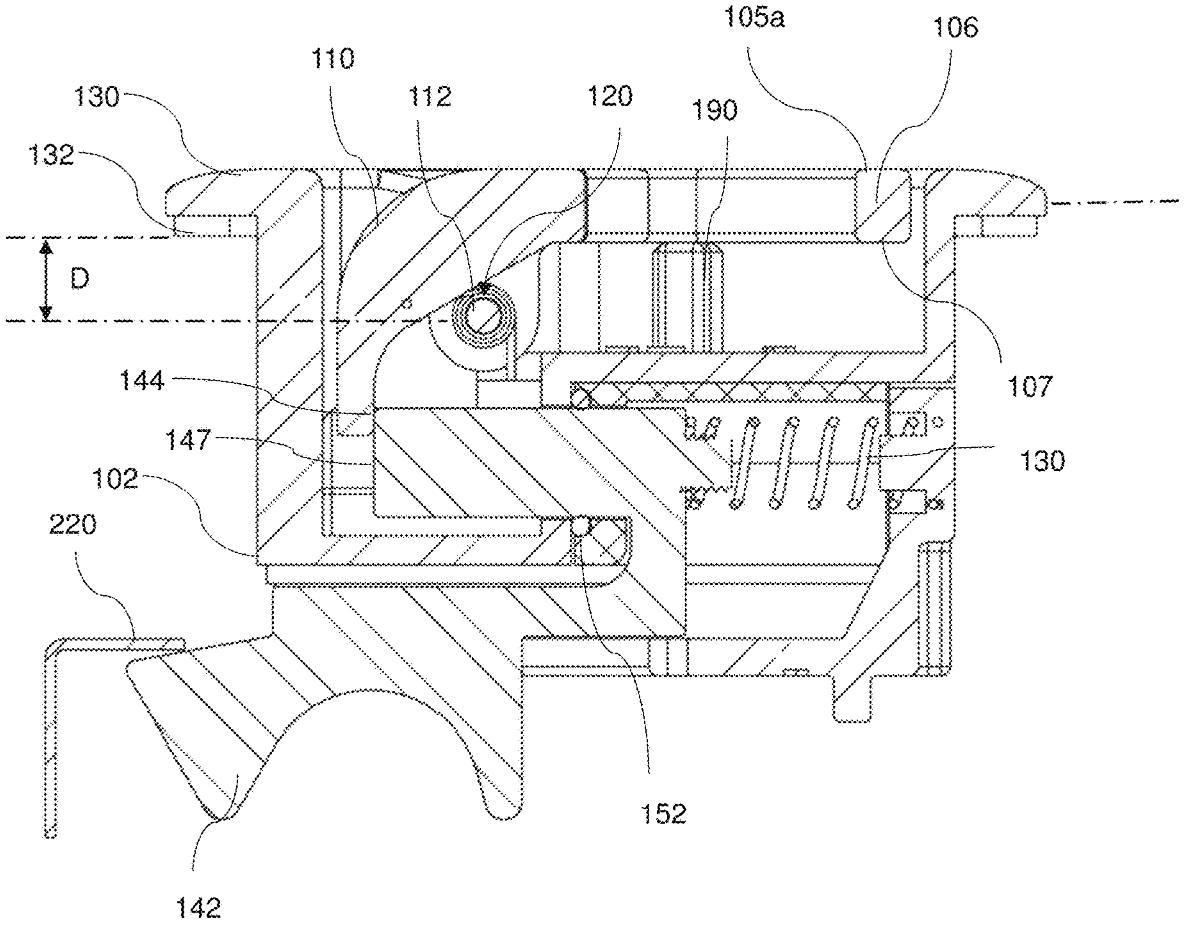
FIG. 6 is cross-sectional view of the latch assembly including the latch pawl shown in FIG. 5.

The embodiment of the latch assembly 100 includes the pivot 120, which comprises an opening to receive a handle pin 112 about which the handle 105 rotates or pivots when a user of the latch assembly lifts the handle 105. Referring now to FIG. 6, which is a cross-sectional view of the latch assembly 100 shown in FIG. 6, the first pivotable portion 106 of the handle 105 has an upper surface **105*a* and a lower surface 107 defining a handle thickness between the upper surface 105*a* and the lower surface 107. The handle pin 112 is engaged with the pivot 120 at a distance D from the lower surface 107 of the handle 105** and the distance D defines a pivot radius of the handle.

The transition region 110 of the handle pin is curved about the pivot 120, as bend shown in FIG. 6. Referring back to FIG. 2, the transition region 110 of the handle 105 of the latch assembly defines an arc having a central angle A in a range of 75-105 degrees. An arc with an angle in this range of 75-105 degree provides smooth operation of the handle and clearance between the transition region 110 and the latch body when the handle is opened and closed. In specific embodiments, the central angle A of the arc is 90 degrees.

Advantageously, according to one or more embodiments of the latch assembly 100 described herein, the slide lock assembly 140 is removable from the latch body 102 the latch assembly 100. In one or more embodiments, access to the interior component of the slide lock assembly 140 is provided by slide lock assembly 140 being removably mounted to the latch body 102.

In the embodiment show, the slide lock assembly 140 includes a removable cover plate 160 that can be removably attached to the latch body 102. In some embodiments, fasteners 166 are provided, which can be screws or bolts that are threadably engaged with openings 164 in the latch body 102. In other embodiments, the removable cover plate 160 can be engaged and disengaged by a receiving slot or other structure to hold removable cover plate 160 from the latch body 102. The pawl biasing element 154 in the form of a spring fits over the second end 148 of the pawl engagement rod 146 and seats in a biasing element receptacle 162 formed in the cover plate 160. The pawl biasing element 154 is compressed against the pawl engagement rod 146, thus biasing the pawl engagement rod 146 and the pawl 142 outwardly into a latched position.

Referring to FIGS. 5 and 6, the slide lock assembly 140 comprises an O-ring 152 that prevents ingress of water into the slide lock assembly 140, which also prevents or minimizes intrusion of water through the latch assembly 100 and leakage of water into a compartment or hatch. The latch assembly 100 further includes a pawl engagement rod sleeve 150 through which the pawl engagement rod 146 slidably moves as the handle is raised and lowered to engage and disengage the latch.

In the embodiment shown, the pawl engagement rod sleeve 150 comprises an O-ring recess 180 configured to receive the O-ring 152. The recess can be chamfered or molded into the pawl engagement rod sleeve 150. In some embodiments, the pawl engagement rod sleeve 150 is a plastic part, which allows the part to be easily replaced when an O-ring is worn or compromised. Thus, a new O-ring 152 and a pawl engagement rod sleeve 150 can be provided as a replacement part kit to facilitate replacement of a worn O-ring 152. Thus, according to one or more embodiments, the O-ring 152 seats in the O-ring recess 180 when the slide lock assembly 140 is fastened to the latch body 102. As will be understood, the removable cover plate 160 permits access to the O-ring, allowing replacement of the O-ring 152. This allows a user of the latch assembly 100 to replace only the O-ring 152 (or the O-ring 152 and the pawl engagement rod sleeve 150), greatly reducing the cost of replacement of a latch O-ring should the O-ring become worn or damaged in use.

FIG. 5 shows an embodiment in which the latch assembly 100 includes a lock assembly 200. The lock assembly 200 comprises a lock shaft 201 and washer 204, 206 that allow the lock shaft 201 to form a watertight lock with the latch body 102. Lock indicia 172 indicates if the lock is in a locked or an unlocked condition. The lock assembly 200 further includes a lock spring 210 and a locking tab 212 configured to engage a lock catch. The lock assembly 200 may further comprise a key receptacle 202 at the top of the lock assembly, enabling the latch to be locked and unlocked.

In another embodiment, a latch assembly 100 comprises a latch body 102 comprising a first side 101, a second side 103 opposite the first side 101, a slide lock receiving channel 190 as shown in FIG. 6 and a cavity 104 between the first side and the second side. As shown in the previously described embodiment, there is a handle 105 comprising a first pivotable portion 106 joined to a first end of a transition region 110 and a pawl engagement tab 114 extending from a second end of the transition region 110. The transition region 110 includes a pivot 120, and the handle 105 is pivotably mounted in the cavity 104.

There is a removable a slide lock assembly 140 including a pawl engagement rod 146 and a pawl 142 slidably mounted within a slide lock receiving channel 168 and biased outwardly from the latch body 102 to a latched position. The pawl engagement tab 114 is positioned and configured to directly engage the pawl engagement rod 146 when the first pivotable portion 106 of the handle 105 is pivoted from the cavity. The slide lock assembly 140 comprises a removable cover plate 160 enabling access to the slide lock assembly 140.

In additional embodiments, the latch assembly 100 further comprise the O-ring 152 and the pawl engagement rod sleeve 150 including the O-ring recess 180, and the O-ring is mounted in the O-ring receptacle, facilitating easy replacement of the O-ring and greatly decreasing the replacement cost of the part when the O-ring becomes worn or otherwise not usable. The direct engagement of the handle with the pawl engagement rod 146 greatly simplifies the design of the latch assembly and reduces the changes of water intruding through the latch assembly.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. A latch assembly comprising:

a latch body comprising a first side, a second side opposite the first side, a slide lock receiving channel, and a cavity between the first side and the second side;

a handle comprising a first pivotable portion joined to a first end of a transition region and a pawl engagement tab extending from a second end the transition region, the transition region including a pivot and the handle pivotably mounted in the cavity; and a slide lock assembly including a pawl engagement rod including a handle engagement surface and the slide lock further including a pawl slidably mounted within the slide lock receiving channel and biased outwardly from the latch body to a latched position, the pawl engagement tab positioned and configured to directly engage the pawl engagement rod when the first pivotable portion of the handle is pivoted from the cavity, without any intervening structure with the handle engagement surface.

2. The latch assembly of claim 1, wherein when the first pivotable portion of the handle is pivoted from the cavity, the pawl engagement tab moves the pawl engagement rod and the pawl inwardly from the latched position to an unlatched position.

3. The latch assembly of claim 1, wherein the pawl engagement rod is located in a spaced relationship from the pawl.

4. The latch assembly of claim 1, the pivot comprises a handle pin about which the handle pivots.

5. The latch assembly of claim 4, wherein the first pivotable portion of the handle has an upper surface and a lower surface, and the handle pin is engaged with the handle at a distance D from the lower surface, thereby defining a pivot radius of the handle.

6. The latch assembly of claim 5, wherein the transition region of the handle is curved about the pivot.

7. The latch assembly of claim 6, the transition region defining an arc having a central angle A in a range of 75-105 degrees.

8. The latch assembly of claim 7, wherein the central angle A of the arc is 90 degrees.

9. The latch assembly of claim 1, wherein the slide lock assembly is removable from the latch body.

10. The latch assembly of claim 9, wherein the slide lock assembly comprises a removable cover plate and fasteners.

11. The latch assembly of claim 10, wherein the slide lock assembly comprises an O-ring that prevents ingress of water into the slide lock assembly.

12. The latch assembly of claim 11, further comprising a pawl engagement rod sleeve through which the pawl engagement rod slidably moves.

13. The latch assembly of claim 12, wherein the pawl engagement rod sleeve comprises an O-ring recess configured to receive the O-ring.

14. The latch assembly of claim 13, wherein the O-ring seats in the O-ring recess when the slide lock assembly is fastened to the latch body.

15. The latch assembly of claim 14, wherein the removable cover plate permits access to the O-ring, allowing replacement of the O-ring.

16. The latch assembly of claim 1, further comprising a lock assembly comprising a lock shaft mounted to the latch body.

17. The latch assembly of claim 16, wherein the lock assembly comprises the lock shaft extending through the latch body and a locking tab configured to engage a lock catch.

18. A latch assembly comprising:

a latch body comprising a first side, a second side opposite the first side, a slide lock receiving channel, and a cavity between the first side and the second side;

a handle comprising a first pivotable portion joined to a first end of a transition region and a pawl engagement tab extending from a second end the transition region, the transition region including a pivot and the handle pivotably mounted in the cavity; and a removable slide lock assembly including a pawl engagement rod including a handle engagement surface, and the removable slide lock further including a pawl slidably mounted within the slide lock receiving channel and biased outwardly from the latch body to a latched position, the pawl engagement tab positioned and configured to directly engage the pawl engagement rod when the first pivotable portion of the handle is pivoted from the cavity, wherein the slide lock assembly comprises a removable cover plate, enabling access to the slide lock assembly, without any intervening structure with the handle engagement surface.

19. The latch assembly of claim 18, the latch assembly further comprising an O-ring and a pawl engagement rod sleeve including an O-ring receptacle.

20. The latch assembly of claim 19, wherein the O-ring is removably mounted in the O-ring receptacle.

* * * * *